Figure 1:
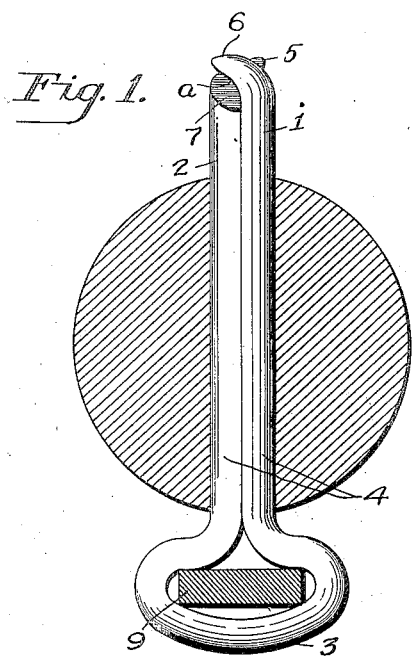

P. K. STERN.
EXPANSION COTTER PIN.
APPLICATION FILED DEC. 3, 1912.

1,097,371.

Patented May 19, 1914.

WITNESSES

Philip K. Stern INVENTOR

UNITED STATES PATENT OFFICE.

PHILIP K. STERN, OF NEW YORK, N. Y., ASSIGNOR TO FRANK M. RANDALL MFG. CORPORATION, OF NEW YORK, N. Y.

EXPANSION COTTER-PIN.

1,097,371.   Specification of Letters Patent.   Patented May 19, 1914.

Application filed December 3, 1912. Serial No. 734,757.

*To all whom it may concern:*

Be it known that I, PHILIP K. STERN, a citizen of the United States, residing in the city, county, and State of New York, have invented certain new and useful Improvements in Expansion Cotter-Pins, of which the following is a specification.

My invention in expansion cotter pins relates to a cotter pin formed of half-round wire, bent to form an eye and shank: the latter having a cylindrical cross-section, the shank having its outer terminals cut obliquely, to form overlapping points which are bent over the oblique sides of each, to form a pointed camming end. The eye of my improved cotter pin is formed in a manner to provide a transverse oblong opening for the reception of a flat blade, as for example, the blade of a screw driver, whereby the camming points of the shank may be brought into action to expand the same at the free end, to accomplish the locking of the pin.

The object of my invention is to provide a simple and inexpensive construction for cotter pins which will afford the security of the pin in its set position, ease in manipulation and application, and simplicity in its construction, together with low cost of production.

The feature of my invention, whereby I am enabled to attain the object thereof is characterized by the construction as depicted in the drawings hereto attached, which, when taken with the correlative appended descriptive matter form part of this specification, and the distinct features of novelty are referred to in the claims.

Figure 2:
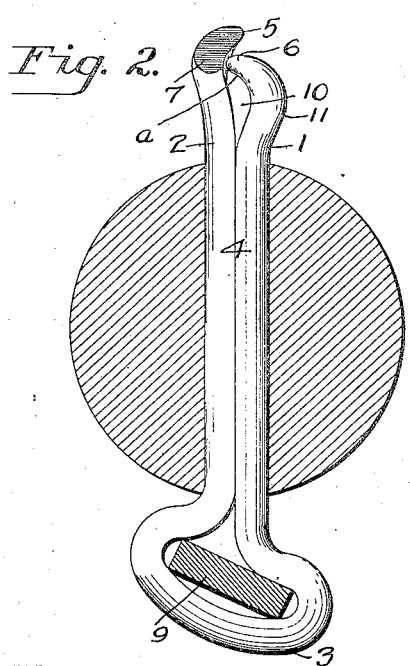
Figure 3:
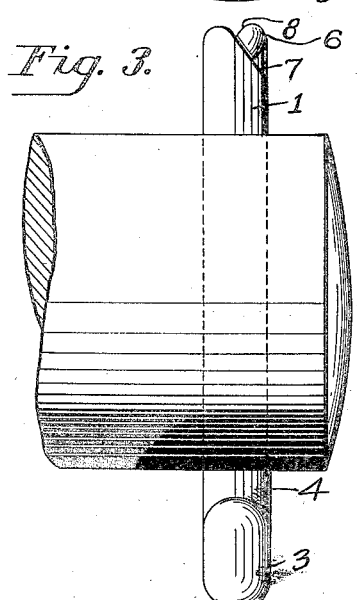
Figure 4:
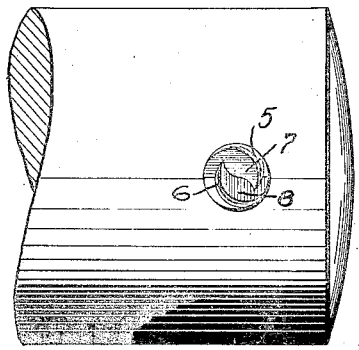

With reference to the drawings, Figure 1 is a side elevational view of one of my improved expansion cotter pins in an unexpanded condition and a section of material, as for example, a bolt through which the pin is thrust, together with a section of a blade, as for example, that of a screw driver, thrust into the eye of the pin in a horizontal position, in order to manipulate the same, and Fig. 2 is a similar view to that of Fig. 1, illustrating the free extremity of the pin expanded by the action of the camming points, being caused to assume the position shown when the blade is forced into the inclined position, as illustrated. Fig. 3 is a similar view of the cotter pin to that of Fig. 1, and a side elevational view of a fragment of the bolt shown in section in Fig. 1, and, Fig. 4 is a view of the bolt similar to that of Fig. 3, taken at a position 90° from that of Fig. 3, and illustrating the camming points of the pin.

In the several figures, similar characters of reference indicate like or the same parts throughout.

The cotter pin consists of a pair of limbs 1 and 2, formed of half-round wire, bent intermediately of its length with the flat faces opposing each other to form a loop or eye 3, and the limbs 1 and 2 together providing an expanding shank 4. The limbs 1 and 2 have their free ends cut off obliquely, to provide similar projecting overlapping curved points 5 and 6. The oblique formation is referred to at 7 and 8, which is mutually engaged by the bent over points 5 and 6. The underside of the points 5 and 6 are bent to leave an oblique inner surface $a$ on each. The oblique surfaces upon which the points 5 and 6 lie provide together with the inner inclined surfaces $a$ of the points, a pair of wedges, which will be hereinafter referred to as such, whereby, upon pulling down the point 6, by sliding the limb 1 downwardly with respect to the limb 2, illustrated in Fig. 2, by distorting the eye 3 to the right by a right-hand twist of suitable blade or screw driver 9, the under inclined surface $a$ of the point 6 will slide on the wedge 7 and cause the projecting portion of the shank 4 of the pin to become distorted in two directions, namely:—a lateral spread leaving a loop 10 between the limbs 1 and 2, and a bulge 11 opposite thereto, while at the same time, the free ends of limbs 1 and 2 will be displaced from their normal position, limb 1 being in the direction toward the observer in Figs. 1 and 2, and limb 2 in the opposite direction, due to the camming effect of the point 5 and the wedge 7. Thus, it will be observed that a head will be formed on the free end of the shank 4 below the points 5 and 6. It will be obvious that in this condition, the pin will be locked between the eye 3 and the head, resulting from the loop 10 and the bulge 11.

To unlock the cotter pin, the blade 9 is rotated toward the left and brought to the position as illustrated in Fig. 1 when the limb 1 will have been slid upwardly with respect to the limb 2 and the point 6 will be elevated and brought to the position as illustrated in Fig. 1 to overlap the point 5, and lie above the wedge 7, whereupon, the pin may be extracted from the bolt or stud with which it is engaged. The bulge 11, in the meanwhile may be drawn through the cotter pin hole in the bolt or stud. It is obvious by distorting the eye 3 in the opposite direction by continuing the rotation of the blade 9 to the left prior to extracting the cotter pin, the free end of the shank 4 will be again expanded by the point 5 of the limb 2 engaging the oblique surface 8 of the point 6.

It will be understood by the above description of my improved expansion cotter pin that the same is locked by the formation of a head caused by the expansion of the shank 4 of the pin by the sliding of the limbs 1 and 2 with respect to each other, while distorting the eye 3, whereby the greatest ease in manipulation and application is afforded both for locking and releasing the pin and moreover that the same is of simple construction. It is obvious that the small amount of distortion required of the eye 3 in order to expand the end of the pin to form the head affords an opportunity for making use of the pin a number of times without fracturing the material and thus a cotter pin is provided possessing features of durability.

Having fully described my invention, I claim as new and desire to secure by Letters Patent of the United States—

1. An expansion cotter pin comprising, a pair of limbs formed of half-round wire bent intermediately of its length to form an elongated head having a transverse elongated eye, each of said limbs having an oblique free end and a curved point portion constituting a pair of wedges, whereby the outer free end of each limb will be distorted upon laterally sliding of the limbs longitudinally.

2. An expansion cotter pin comprising, a pair of limbs formed of half-round wire bent intermediately of its length to form a shank portion and an elongated head portion having a transverse elongated eye, each of said limbs having an oblique outer free end and a curved point having an oblique surface, whereby the outer free ends of the limbs will be distorted in opposite directions upon laterally sliding the limbs longitudinally, substantially as described.

In testimony whereof, I have signed my name to this specification in the presence of two subscribing witnesses.

PHILIP K. STERN.

Witnesses:
   ELIZABETH L. STERN,
   ANNA MEYERS.